United States Patent [19]
Dickson et al.

[11] Patent Number: 5,602,657
[45] Date of Patent: Feb. 11, 1997

[54] HOLOGRAM SYSTEM HAVING HOLOGRAM LAYERS WITH ROTATIONALLY OFFSET BRAGG PLANES

[75] Inventors: LeRoy D. Dickson, Morgan Hill, Calif.; Richard D. Rallison, Paradise, Utah

[73] Assignee: International Business Machines Corporation, Armonk, N.Y.

[21] Appl. No.: 545,914

[22] Filed: Oct. 20, 1995

Related U.S. Application Data

[63] Continuation of Ser. No. 293,783, Aug. 22, 1994, abandoned, which is a continuation of Ser. No. 993,246, Dec. 17, 1992, abandoned.

[51] Int. Cl.$^6$ .............................. G02B 5/32; G02B 5/18; G03H 1/28; G11B 7/00
[52] U.S. Cl. .................... 359/15; 359/24; 359/1; 359/566; 359/576; 369/103
[58] Field of Search ...................... 359/3, 15, 22, 359/24, 487, 501, 566, 569, 16

[56] References Cited

U.S. PATENT DOCUMENTS

| | | | |
|---|---|---|---|
| 3,622,220 | 11/1971 | Kogelnik et al. | 350/3.5 |
| 4,497,534 | 2/1985 | Sincerbox | 350/3.72 |
| 4,993,789 | 2/1991 | Biles et al. | 130/3.7 |
| 5,013,107 | 5/1991 | Biles | 350/3.7 |
| 5,071,210 | 12/1991 | Arnold et al. | 359/15 |
| 5,103,323 | 4/1992 | Magarinos et al. | 350/3.7 |
| 5,179,630 | 1/1993 | Chang et al. | 359/15 |
| 5,212,572 | 5/1993 | Krantz et al. | 359/15 |
| 5,272,550 | 12/1993 | Dickson et al. | 359/3 |
| 5,331,445 | 7/1994 | Dickson et al. | 359/15 |

FOREIGN PATENT DOCUMENTS

| | | | |
|---|---|---|---|
| 0123048 | 10/1984 | European Pat. Off. | G02B 5/32 |
| 350014 | 10/1990 | European Pat. Off. | G03H 1/02 |
| 0545524 | 6/1993 | European Pat. Off. | G02B 5/32 |
| 61-42613 | 3/1986 | Japan | G02B 26/02 |
| 61-123032 | 6/1986 | Japan | G11B 7/135 |
| 62-219340 | 9/1987 | Japan | G11B 7/135 |
| 63-25845 | 2/1988 | Japan | G11B 7/135 |
| 118175 | 1/1989 | Japan | G03H 1/04 |
| 113246 | 1/1989 | Japan | G11B 11/10 |
| 186332 | 3/1989 | Japan | G11B 7/09 |
| 155745 | 3/1989 | Japan | G11B 7/09 |
| 155746 | 3/1989 | Japan | G11B 7/09 |
| 155359 | 3/1989 | Japan | G11B 7/135 |
| 186337 | 3/1989 | Japan | G11B 7/135 |
| 1146143 | 6/1989 | Japan | G11B 7/135 |
| 1053056 | 11/1983 | U.S.S.R. | G02B 5/32 |
| WO8304317 | 12/1983 | WIPO | G02B 5/32 |
| WO8500674 | 2/1985 | WIPO | G03H 1/18 |

OTHER PUBLICATIONS

Kawatsuki and Uetsuki, Crossed Grating Beam Splitter for Magnetooptical Pickup Head, Nov. 1990, pp. 2420–2423.
E. Glytsis and T. Gaylord, Rigorous Three–Dimensional Coupled–Wave Diffraction Analysis of Single and Cascaded Anisotropic Gratings, Nov. 1987, pp. 2061–2080.

*Primary Examiner*—Thong Nguyen
*Assistant Examiner*—Audrey Chang
*Attorney, Agent, or Firm*—Douglas R. Millett; Noreen A. Krall

[57] ABSTRACT

A hologram system is comprised of two identical volume holograms. Both holograms have Bragg planes oriented perpendicular to the surface of the hologram. The first volume hologram separates a single beam into two orthogonal polarization component beams. The second volume hologram diffracts one of the polarization component beams such that a desired separation angle is achieved between the two beams. This separation angle may be precisely adjusted during manufacture by orienting the Bragg planes of the second volume hologram at a rotational angle with respect to the Bragg planes of the first volume hologram.

32 Claims, 8 Drawing Sheets

HOLOGRAM SYSTEM HAVING HOLOGRAM LAYERS WITH ROTATIONALLY OFFSET BRAGG PLANES

This is a continuation of patent application Ser. No. 08/293,783 filed Aug. 22, 1994, now abandoned, which is a continuation of patent application Ser. No. 07/993,246 filed Dec. 17, 1992, now abandoned.

BACKGROUND OF THE INVENTION

1. Field of the Invention

The present invention relates generally to volume holograms and more specifically to a volume hologram system and method for achieving desired beam separations.

2. Description of the Prior Art

Holograms are recordings of light intensity patterns created by the interference of two beams of mutually coherent light (the two beams are usually obtained by splitting a single laser beam). There are two major categories of holograms: transmissive and reflective. These two categories are further divided into physical types of holograms: surface relief holograms and volume holograms. Surface relief holograms can be recorded using photolithographic processes. The interference pattern is recorded as a periodic variation in thickness of the material while the refractive index of the material remains fixed.

In a volume hologram, the interference pattern is recorded as a periodic variation in the refractive index of the material while the thickness of the material remains fixed. The periodic variation in refractive index creates surfaces of peak refractive index within the material. These surfaces are referred to as Bragg surfaces. When the interference pattern is created by two plane waves or two waves with identical curvature at the hologram surface, the Bragg surfaces will be Bragg planes.

When the hologram is reilluminated by one of the original laser beams at an angle that results in maximum diffraction efficiency, the internal angle of the beam relative to the Bragg planes is referred to as the Bragg angle. The external angle of incidence at which the maximum diffraction efficiency occurs is also often referred to as the Bragg angle.

Recently, holograms have been used in optical data storage applications. These holograms allow beams of light to be separated for various purposes. These hologram systems include the following references: JP 1-13246, published Jan. 18, 1989; JP 1-55745, published Mar. 2, 1989; JP 1-55746, published Mar. 2, 1989; JP 1-86337, published Mar. 31, 1989; JP 1-86332, published Mar. 31, 1989; JP 1-146143, published Jun. 8, 1989; JP 1-55359, published Mar. 1, 1989; JP 63-25845, published Feb. 3, 1988; JP 62-219340, published Sep. 26, 1987; JP 61-123032, published Jun. 10, 1986; JP 1-18175, published Jan. 20, 1989; JP 61-42613, published Mar. 1, 1986; SU 1053056, published Nov. 7, 1983; EP 350,014, published Oct. 1, 1990; U.S. Pat. No. 5,013,107, issued May 7, 1991; and U.S. Pat. No. 4,497,534, issued Feb. 5, 1985.

Pending U.S. application Ser. No. 07/774,410 filed Oct. 10, 1991, assigned to the same assignee as the present application, teaches a volume hologram system which uses two holograms. A first volume hologram divides an incoming beam into two beams of desired polarization and/or intensity, and a second volume hologram adjusts the angular position of one beam with respect to the other.

A problem with using volume holograms has been that they are difficult to manufacture. The processing of the volume hologram may result in shrinkage of the hologram material and subsequent distortion of the Bragg planes. This makes it hard to accurately and consistently make a hologram system which achieves the desired beam separation at the desired angles.

What is needed is a volume hologram system which is easy to manufacture and consistently achieves the desired beam separations.

SUMMARY OF THE INVENTION

Briefly, in a preferred embodiment, the present invention comprises two volume holograms on two separate substrates which are cemented together with a thin optical adhesive. The two holograms are identical to one another and have Bragg planes oriented perpendicular to their surfaces. The holograms are placed together with the optical adhesive located between them. This optical adhesive is radiation activated. The holograms are moved relative to one another until their Bragg planes are offset by a rotational angle relative to one another and the desired amount of beam separation is achieved. The cement is then activated and the holograms are permanently bonded together.

For a fuller understanding of the nature and advantages of the present invention, reference should be made to the following detailed description taken in conjunction with the accompanying drawings.

DESCRIPTION OF THE PREFERRED EMBODIMENTS

Figure 1:
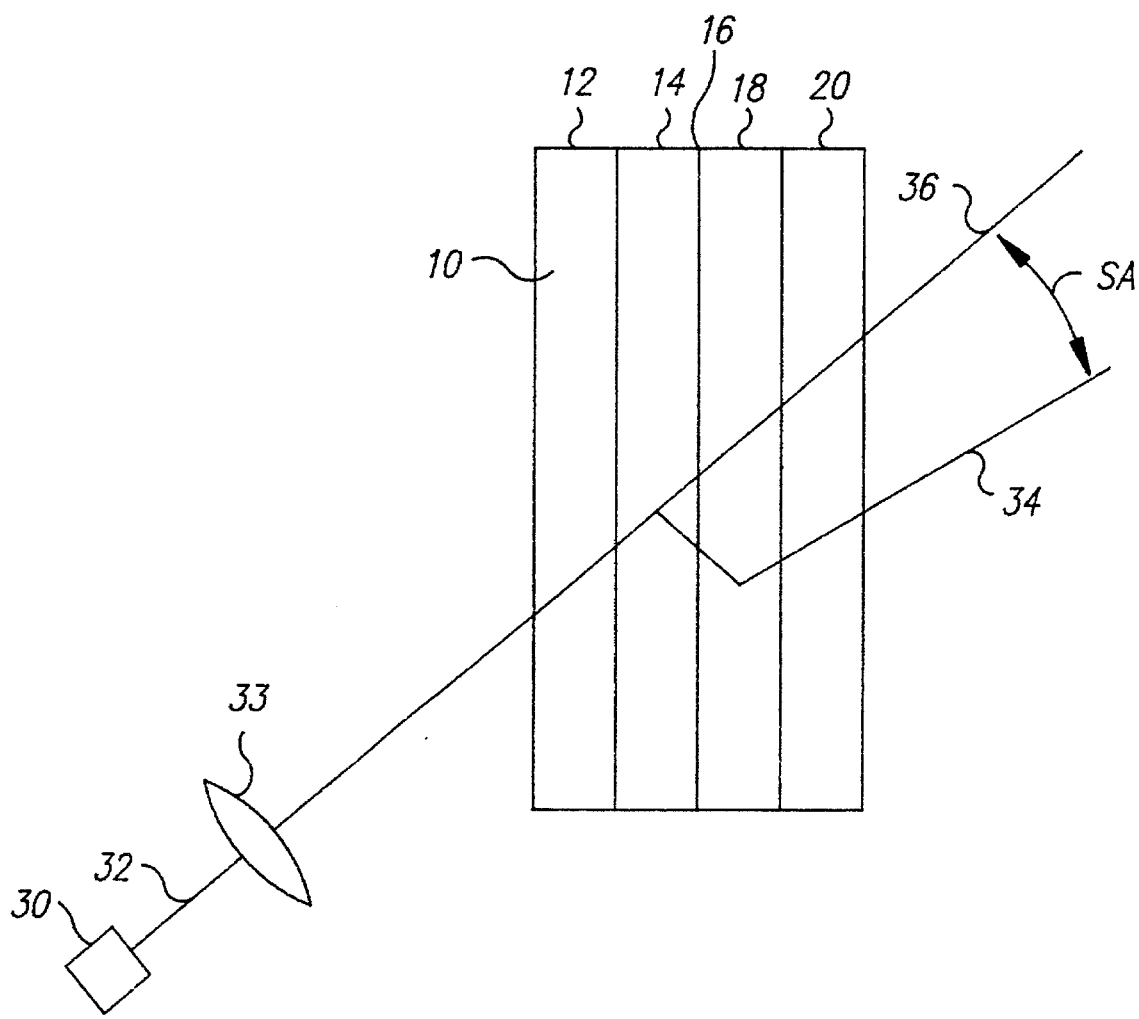
FIG. 1 is a schematic diagram of a hologram system of the present invention.

FIG. 1 is a schematic diagram of a hologram system of the present invention and is designated by the general reference number 10. System 10 is comprised of a substrate 12, a volume hologram 14, a thin layer of a transparent optical cement 16, a volume hologram 18, and a substrate 20. Holograms 14 and 18 are identical holograms. A diode laser 30 emits a laser beam 32. Laser 30 may be a gallium-aluminum-arsenide laser which generates light at approximately 780 nm in wavelength. Beam 32 is collimated by a lens 33.

Beam 32 passes through substrate 12 to hologram 14. The beam 32 enters hologram 14 at its Bragg angle. Hologram 14 diffracts the P polarization component of beam 32 as a beam 34 and passes undiffracted the S polarization of beam 32 as a beam 36. The orthogonal polarization components of light are generally referred to as S and P.

Beam 36 passes through hologram 18 undiffracted and passes through substrate 20. Beam 34 enters hologram 18 at approximately the Bragg angle of hologram 18 and is diffracted and exits through substrate 20. Since hologram 18 is identical to hologram 14, beam 34 would normally diffract back in the exact same direction as beam 36. This is true if the two holograms 14 and 18 are aligned. In such a case there would no angular separation between the beams 34 and 36 and hologram system 10 would be not be useful. However, as explained in more detail below, hologram system 10 is made with a slight rotational angular offset between holograms 14 and 18. This offset causes there to be an angular separation (SA) between beams 34 and 36. The exact desired amount of angular separation may be adjusted at the time of manufacture. Thus, the present invention is able to achieve a volume hologram system which produces the exact amount of desired angular separation.

Figure 2:
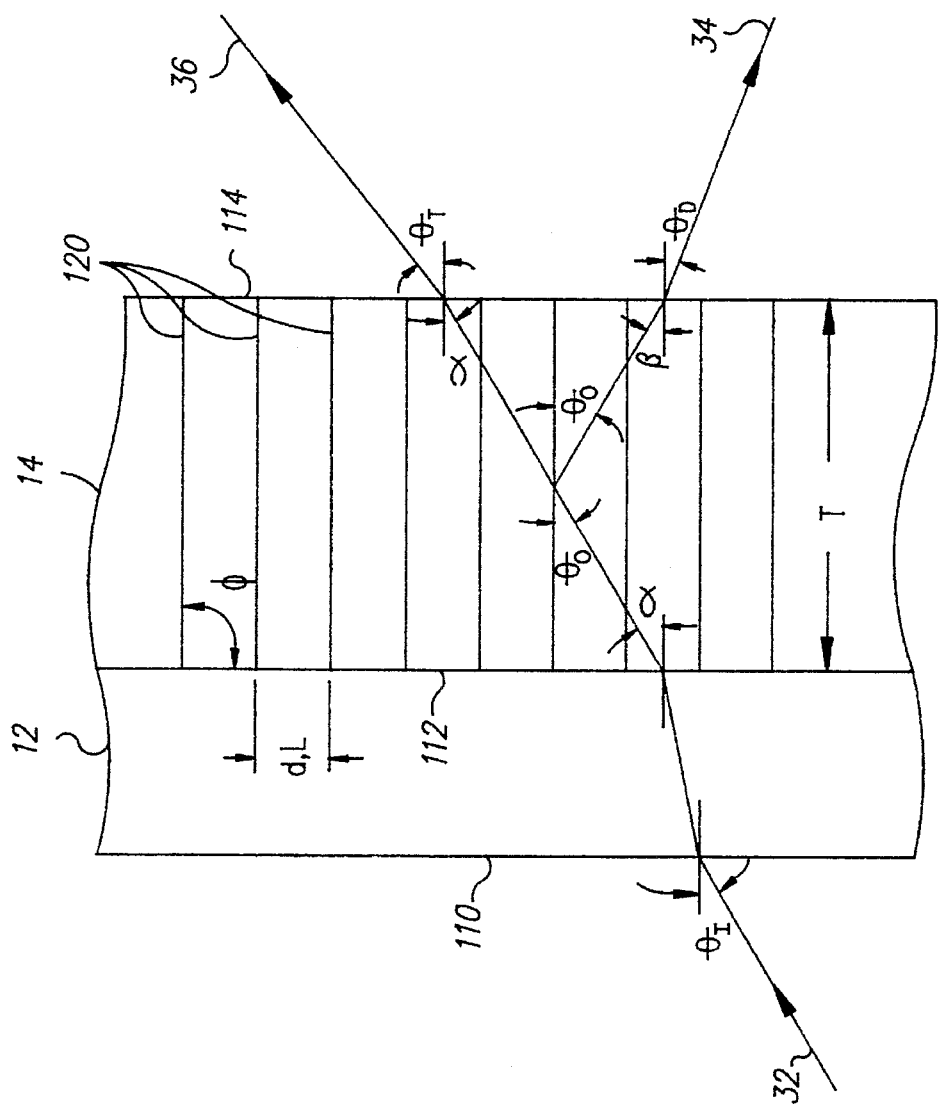
FIG. 2 is a detailed cross-sectional view of a single hologram of the present invention.

FIG. 2 is a detailed cross-sectional view of volume hologram 14 and substrate 12 which comprises a hologram assembly 100. Hologram 14 has a thickness T and is deposited onto substrate 12. The hologram 14 is made of a hologram material and is preferably dichromated gelatin. The substrate 12 is preferably made of glass. There is an external surface 110, a surface 112 between hologram 14 and substrate 12, and another surface 114 on the opposite side of hologram 14.

The hologram 14 has periodic Bragg planes 120. The Bragg planes 120 have a separation distance L (absolute separation distance), and an external fringe spacing distance d (the distance separation along surface 112). The Bragg planes 120 are set at an angle $\phi$ relative to surface 112. Note that in the preferred embodiment $\phi=90°$ and as a result, $d=L$.

In operation, the beam 32 (having a wavelength $\lambda_1$) enters substrate 12 at surface 110 at an angle $\theta_I$ with respect to the perpendicular. The beam 32 experiences refraction at both surfaces 110 and 112, and enters the hologram 14 at an internal incidence angle $\alpha = a\sin[\sin \theta_I (n_\alpha/n_O)]$ where $n_O$ is the average index of refraction of hologram 14 (typically 1.26 for-processed dichromated gelatin) and $n_\alpha$ is the index of refraction of the outside environment (typically 1.0 for air). A portion of beam 32 passes through hologram 14 without experiencing any diffraction and exits hologram 14 as a beam 36. Note that beam 36 experiences refraction at surface 114. Beam 36 exits surface 114 at a transmitted output angle of $\theta_T$ where $\theta_T = a\sin[(\sin \alpha) n_O/n_\alpha]$ where $n_\alpha$ is the index of refraction of the surrounding material. As will be seen later, in the case where hologram 18 abuts hologram 14, $\theta_T$ will equal $\alpha$.

A portion of beam 32 is diffracted by the Bragg planes 120. The angle of beam 32 relative to Bragg plane 120 is $\theta_O$ and is equal to $a\sin[\lambda_1/2n_OL]$. The diffracted beam encounters surface 114 at an internal diffraction angle $\beta$. The diffracted beam exits hologram 14 at surface 114 as beam 34. Beam 34 exits surface 114 at a diffracted output angle of $\theta_D$ where $\theta_D$ equals $a\sin[\sin \beta(n_O/n_\alpha)]$. The exact properties of beams 34 and 36 are described in more detail below.

In designing the hologram 14, the following variables are taken into account:

$\theta_I$=angle of incidence (external).

$\alpha$=angle of incidence (internal).

$\beta$=angle of diffraction (internal).

$\delta$=deviation from the Bragg angle. Assumed to be equal to zero.

$\phi$=tilt of Bragg planes.

$=\pi/2$ for no tilt.

L =separation of the Bragg planes.

T =thickness of hologram material.

d =external fringe spacing.

$n_O$=average refractive index of the hologram medium, typically 1.26 for an exposed and processed dichromated gelatin holographic grating with high $n_1$.

$n_1$=Peak change in index of refraction of the hologram medium. Typically 0.1 for dichromated gelatin.

$\lambda a$=wavelength of light in air. Here a $\lambda a = \lambda_1 = 780$nm.

$\delta\lambda$=deviation from $\lambda a$ (Bragg $\lambda$). Assumed to be equal to zero.

These variables are used in the following formulas:

$$\alpha = a\sin\left[\frac{\sin[\theta_I]}{n_0}\right] \quad (1)$$

$$\phi = \frac{\pi}{2} - \frac{\beta - \alpha}{2} \quad (2)$$

$$\theta_0 = \alpha + \frac{\pi}{2} - \phi \quad (3)$$

$$L = \frac{\lambda_a}{2n_0\sin[\theta_0]} \quad (4)$$

$$d = \frac{L}{\sin(\phi)} \quad (5)$$

$$C_R = \cos(\alpha) \quad (6)$$

$$C_S = \cos(\alpha) - \frac{\lambda_a}{n_0 L}\cos(\phi) \quad (7)$$

$$N = \pi n_1 \frac{T}{\lambda_a \sqrt{C_R C_S}} \quad (8)$$

$$\Gamma = 2\pi\delta\frac{\sin[\phi - \theta_0]}{L} - \delta\lambda\frac{\pi}{n_0 L^2} \quad (9)$$

$$S = \Gamma\frac{T}{2C_S} \quad (10)$$

$$E_S = \frac{[\sin[\sqrt{N^2 + S^2}\,]]^2}{1 + \frac{S^2}{N^2}} \quad (11)$$

$$E_P = \frac{[\sin[\sqrt{[N\cos[2\theta_0]]^2 + S^2}\,]]^2}{1 + \frac{S^2}{[N\cos[2\theta_0]]^2}} \quad (12)$$

The formulas 11 and 12 above give the diffraction efficiencies for the S and P orthogonal polarization components and determine the condition of beams 34 and 36. Es is the diffraction efficiency of the S polarized light component, and Ep is the diffraction efficiency of the P polarized light component. A more detailed discussion of the hologram mathematics is given by Herwig Kogelnik in "Coupled Wave Theory for Thick Hologram Gratings," Bell System Technical Journal, Vol. 48, No. 9, p. 2909 (November 1969).

Figure 3:
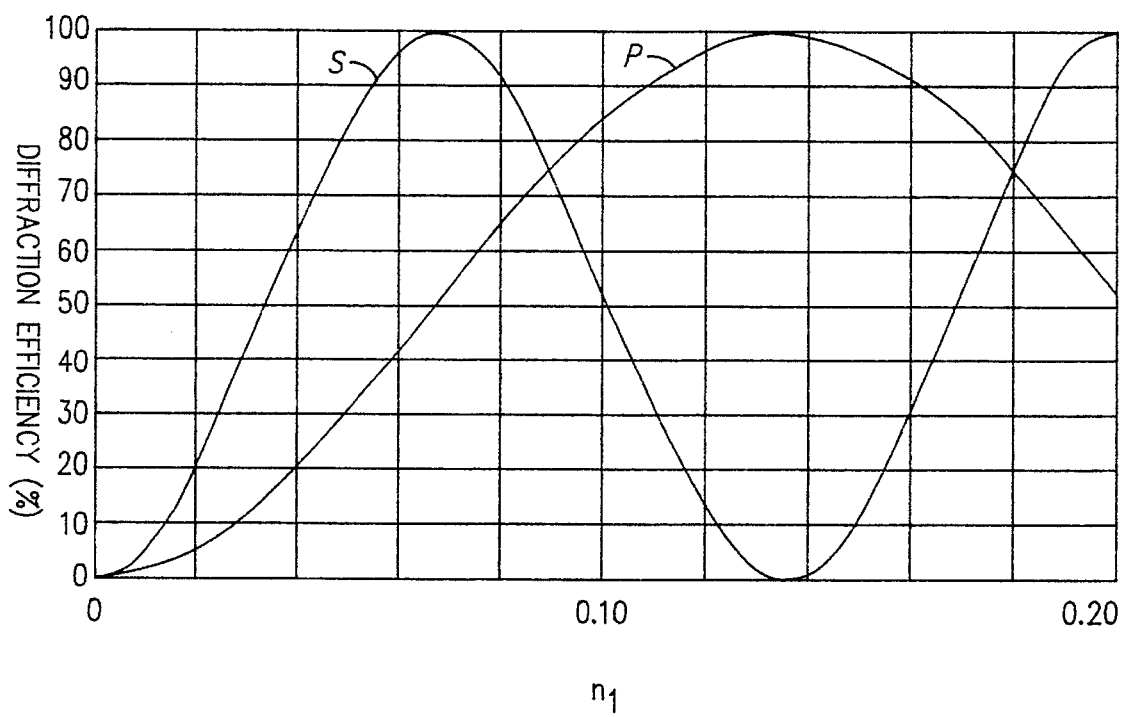
FIG. 3 is a graph of diffraction efficiency versus peak change in index of refraction for a volume hologram of the present invention.

FIG. 3 shows a graph of diffraction efficiency for Es and Ep versus the peak index of refraction ($n_1$) for hologram 14. In the case of hologram 14, the parameters are $\theta_I = 39.05°$, $\phi = 90°$, $\alpha = \beta = 30°$, T=5 microns, and $\lambda_\alpha = 780$ nm. The diffraction efficiency represents the percentage of beam 32 which is diffracted as beam 34. The remaining portion of beam 32 will continue as beam 36. For example, at $n_1 = 0.135$, 100% of the P polarized light will be diffracted as beam 34 and 0% of the S polarized light will be diffracted. Beam 34 will have 100% of the P polarized light and 0% of the S polarized light while beam 36 will have 100% of the S polarized light and 0% of the P polarized light. In this case, hologram 14 functions as a polarization beamsplitter. In the preferred embodiment, it is desired that hologram 14 act as such a beamsplitter and so $n_1$ is chosen to be 0.135.

Figure 4:
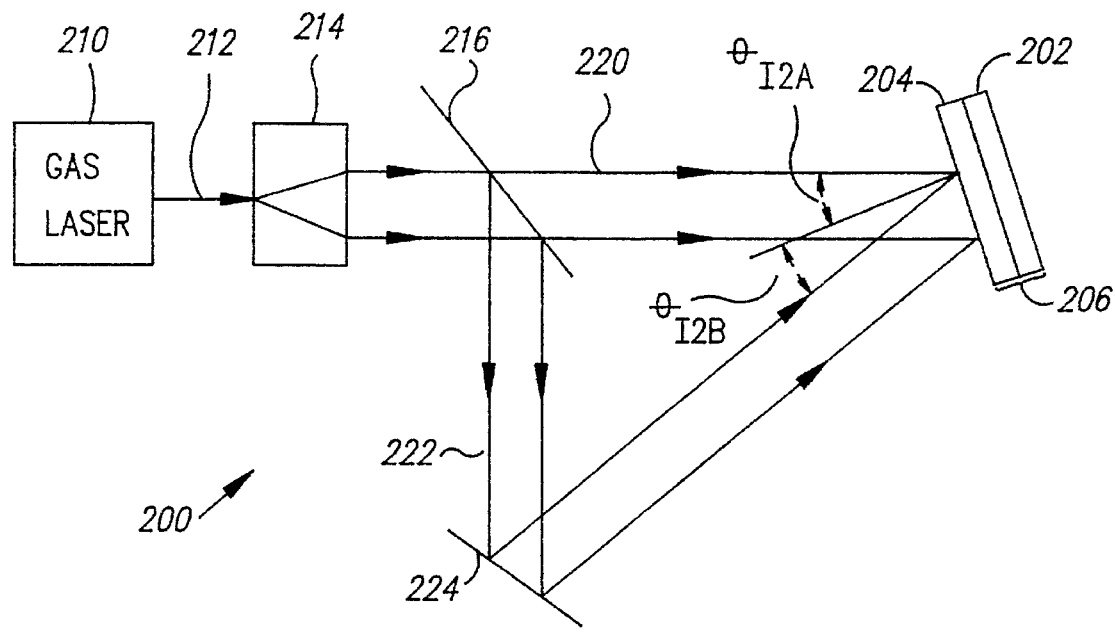
FIG. 4 is a schematic diagram of a system for making a hologram system of the present invention.

FIG. 4 shows a schematic diagram of a system for manufacturing the hologram system 10 and is designated by the general reference number 200. A glass substrate 202 is coated with a holographic material 204 to a depth equal to T. The combined substrate 202 and material 204 are referred to as a plate 206. In a preferred embodiment, dichromated gelatin is used as material 204.

In order to record the hologram, it is necessary to use a light wavelength which will react with hologram material. The recording wavelength $\lambda_2$ should be approximately 488 nm for dichromated gelatin. System 200 uses a gas laser 210 which emits a light beam 212 at the recording wavelength $\lambda_2$. Beam 212 is expanded by a beam expander 214. A beamsplitter 216 splits beam 212 into an object beam 220 and an image beam 222. Beam 222 is reflected by a mirror 224 to plate 206. Beams 220 and 222 intersect at the plate 206 at recording external incident angles of $\theta_{12A}$ and $\theta_{12B}$, respectively. The angles of $\theta_{12A}$ and $\theta_{12B}$ are determined by the conditions of the desired hologram using the formulas described above. Recording internal angles of incidence are $\alpha_{12A}=\phi-\pi/2-\mathrm{asin}[\lambda_2/2n_OL]$ and $\alpha_{12B}=\phi-\pi/2+\mathrm{asin}[\lambda_2/2n_OL]$. From Snell's Law, $\phi_{12A}=\mathrm{asin}(n_O \sin \alpha_{12A})$ and $\phi_{12B}=\mathrm{asin}(n_O \sin \alpha_{12B})$. It should be noted that in equations in this paragraph $n_O$ is the index of refraction of the unprocessed hologram material and is approximately 1.53 for unprocessed dichromated gelatin. The hologram material 204 is thereby exposed to light of wavelength $\lambda_2$ at angles $\theta_{12A}$ and $\theta_{12B}$. The result is that the desired Bragg planes are recorded in the film. The exact exposure and process times are determined by the desired value for $n_1$.

Figure 5:
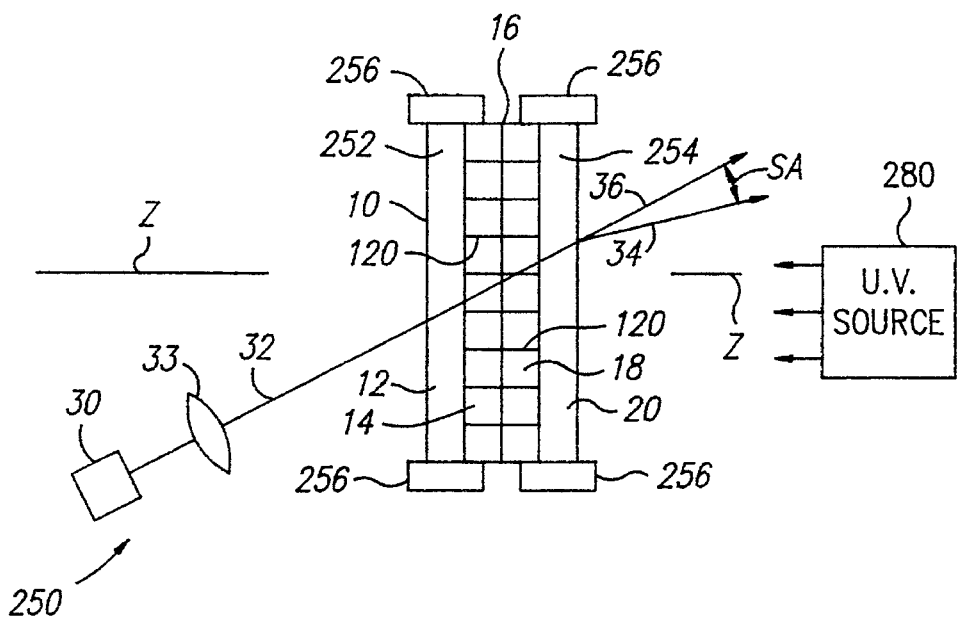
FIG. 5 is schematic diagram of an additional system for making the hologram system of the present invention.

FIG. 5 shows a schematic diagram of a system for further manufacture of the hologram system 10 of the present invention and is designated by the general reference number 250. Once plate 206 has been exposed and processed, it is cut into two equal pieces 252 and 254. Piece 252 corresponds to substrate 12 and hologram 14, and piece 254 corresponds to substrate 20 and hologram 18. Pieces 252 and 254 are positioned together with a transparent optical cement 16 located between the respective holograms 14 and 18. This optical cement is curable by exposure to ultraviolet light.

The resulting assembly (hologram system 10) is placed in the holders of an optical translational and rotational precision stage 256. The pieces 252 and 254 are rotationally moved relative to one another until the Bragg planes 120 of hologram 14 are parallel with the Bragg planes 120 of hologram 18. Laser 30 generates beam 32 at wavelength $\lambda_1$. Beam 32 is collimated by lens 34. Beam 32 is oriented to strike hologram system 10 at the angle $\theta_I$. Because the Bragg planes 120 in holograms 14 and 18 are aligned, beams 36 and 34 will overlap as they exit the hologram system 10. There will be no angular separation. Next, piece 254 is moved rotationally about a z-axis, which is perpendicular to the surfaces of the holograms, while piece 252 remains stationary. As the rotation of the angle between the Bragg planes 120 of the holograms becomes greater, beam 34 begins to move away from beam 36 and an angular separation SA increases. By adjusting the amount of rational angular offset between the Bragg planes of holograms 14 and 18, the desired amount of angular separation (SA) is achieved.

Once the pieces 252 and 254 are oriented such that the desired amount of beam separation is achieved, an ultraviolet light source 280 is energized and floods the system with ultraviolet light. This activates the cement 16 and pieces 252 and 254 are permanently bonded together. System 10 is now complete. Alternatively, optical cement 16 may be a regular time cured cement and the cement is allowed to cure after the holograms have been properly positioned.

It should be noted that many hologram systems of the exact same type may be manufactured easily and efficiently by combining two large plates 252 and 254, bonding them together after alignment, and then slicing the resulting structure up into many smaller hologram systems.

Figure 6:
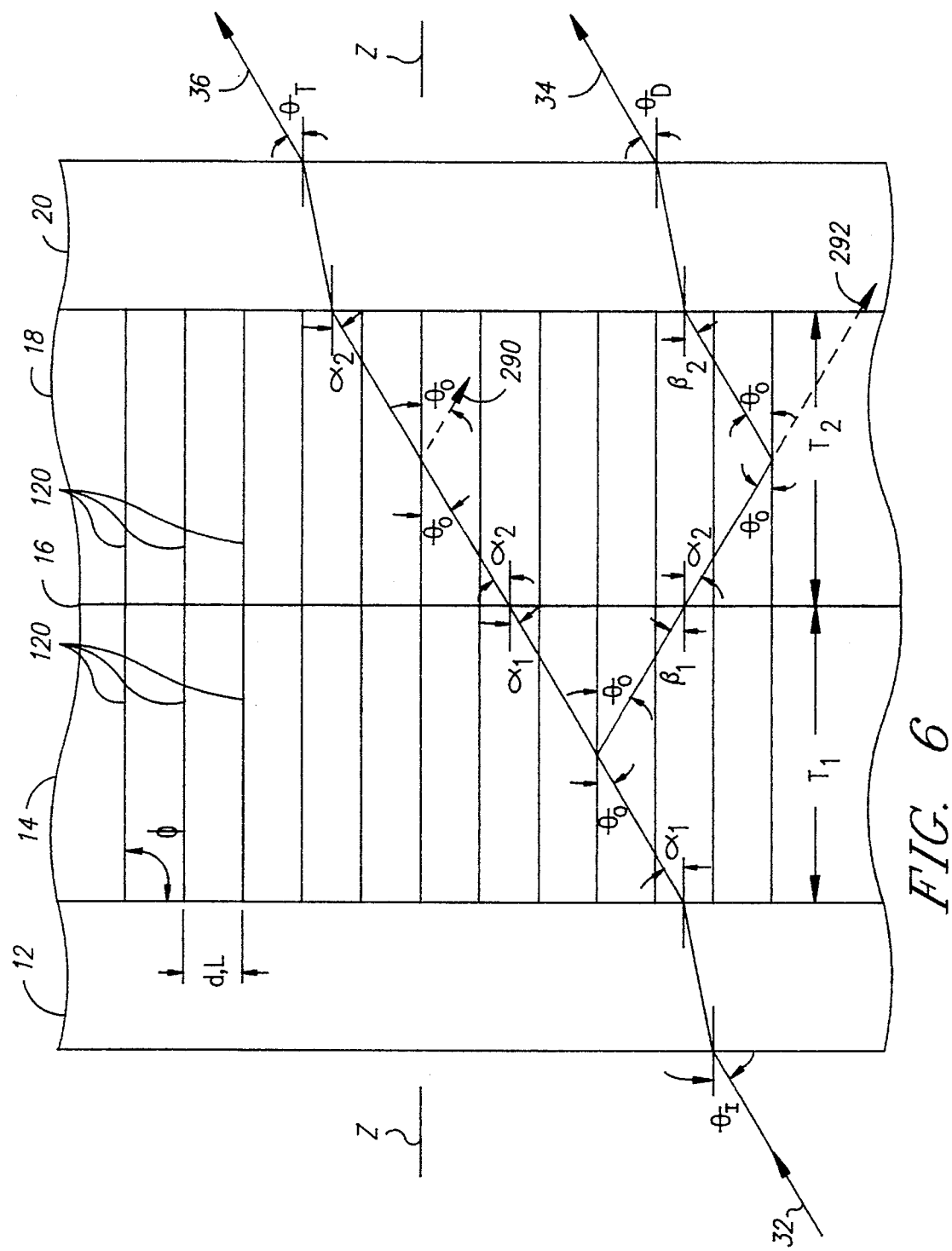
FIG. 6 is a detailed cross-sectional view of a hologram system of the present invention.

FIG. 6 shows a detailed cross-sectional view of the hologram system 10. For purposes of this discussion, it will be assumed that initially the Bragg planes 120 of hologram 14 are parallel to the Bragg planes 120 of hologram 18. In other words, there is initially no rotational offset angle between them.

Holograms 14 and 18 are identical and have Bragg planes oriented perpendicular to their surfaces ($\phi=90°$) and T1 =T2. From the previously described equations, we find that $\alpha_1=\beta_1=\alpha_2=\beta_2$.

Beam 32 enters system 10 at the angle $\theta_t$. After refract substrate 12, beam 32 enters hologram 14 at angle $\alpha_1$. Hologram 14 diffracts the P polarized light component as beam 34 and passes undiffracted the S polarization component as beam 36. Beam 36 enters hologram 18 at an angle $\alpha_2$. From Snell's Law, $\alpha_1=\alpha_2$. Since hologram 18 is identical to hologram 14, beam 36 which contains only S polarized light, will again pass undiffracted. After refraction at the surfaces of substrate 20, the beam 20 exits at an angle $\theta_T$, where $\theta_T=\mathrm{asin}[\sin \alpha_2(n_O/N_\alpha)]$. It should be noted that in the preferred embodiments, beam 36 contains no P polarized light after passing through hologram 14. However, even if hologram 14 is not 100% efficient, and a small fraction of P polarized light still exists in beam 36, it will be diffracted by hologram 18, as shown by the ghost arrow 290.

Beam 34 enters hologram 18 at angle $\alpha_2$. Beam 34 contains only P polarized light and will be diffracted again. Beam 34 exits hologram 18 at angle $\beta_2$. After refraction at the surfaces of substrate 20, beam 34 exits at an angle $\theta_D$, where $\theta_D=\mathrm{asin}[\sin \beta_2(n_O/n_\alpha)]$. Since $\alpha_2=\beta_2$, beam 36 and 34 exit at the same angle and there is no angular separation between them.

Hologram 18 is then rotated slightly about the z-axis, while hologram 14 remains fixed. Beam 34 will be diffracted by hologram 18 at a slight angle out of the plane of the figure, while beam 36 remains essentially in the plane of the figure. The desired angular separation is thereby achieved.

Figure 7:
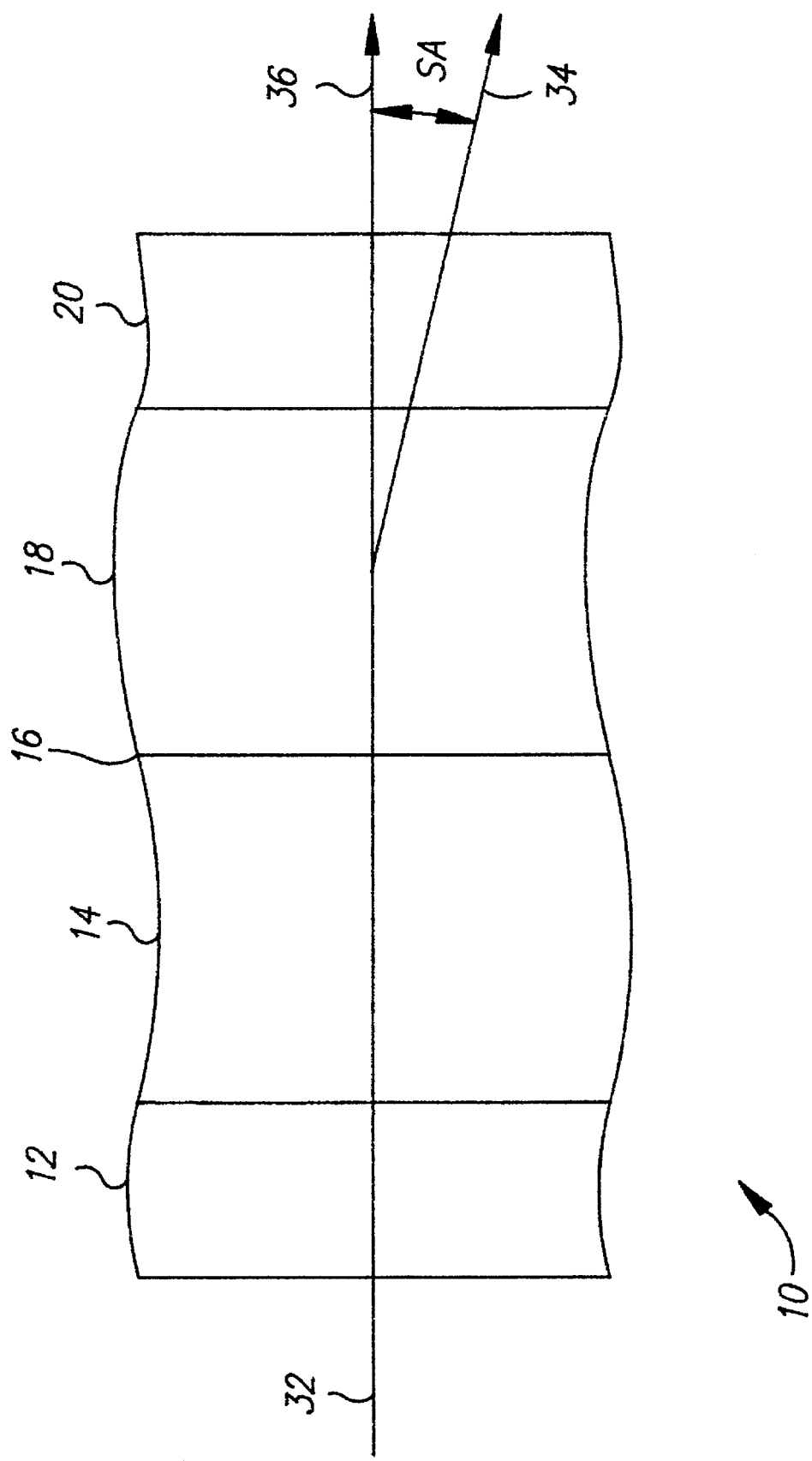
FIG. 7 is a top view of the system of FIG. 6.

FIG. 7 shows a top view of the system 10 of FIG. 6. Note that the angular separation (SA) between beams 34 and 36 is more apparent from this view.

In the preferred embodiment, angular separation from 1 to 10 degrees is easily achievable without significantly reducing the diffraction efficiency of the hologram system 10. As the rotation angle increases, the second hologram 18 becomes less efficient at diffracting the P polarized light of beam 34. However, any P polarized light which is not diffracted will be transmitted as shown by the ghost arrow 292 in FIG. 6. This unused P polarized light is thereby directed away from the P and S beams 34 and 36, respectively, and does not interfere with them. Thus, the polarization separation is still achieved with only a small drop off in the total amount of light contained in the P polarized beam 34.

The present invention uses a preferred embodiment where the Bragg planes 120 are perpendicular to the surface of the holograms (φ=90°). This helps insure that any shrinkage in the holograms due to processing will not adversely affect the angles of the Bragg planes. Although this is preferred, it is possible, with careful processing, to practice the present invention with Bragg planes which are not perpendicular to hologram surface. The design of such holograms uses the same formula as described above. The manufacture of the hologram system is also the same. The two holograms are first aligned such that their Bragg planes are parallel to one another, and they are then rotationally offset from one another until the desired amount of beam separation is achieved.

Figure 8:
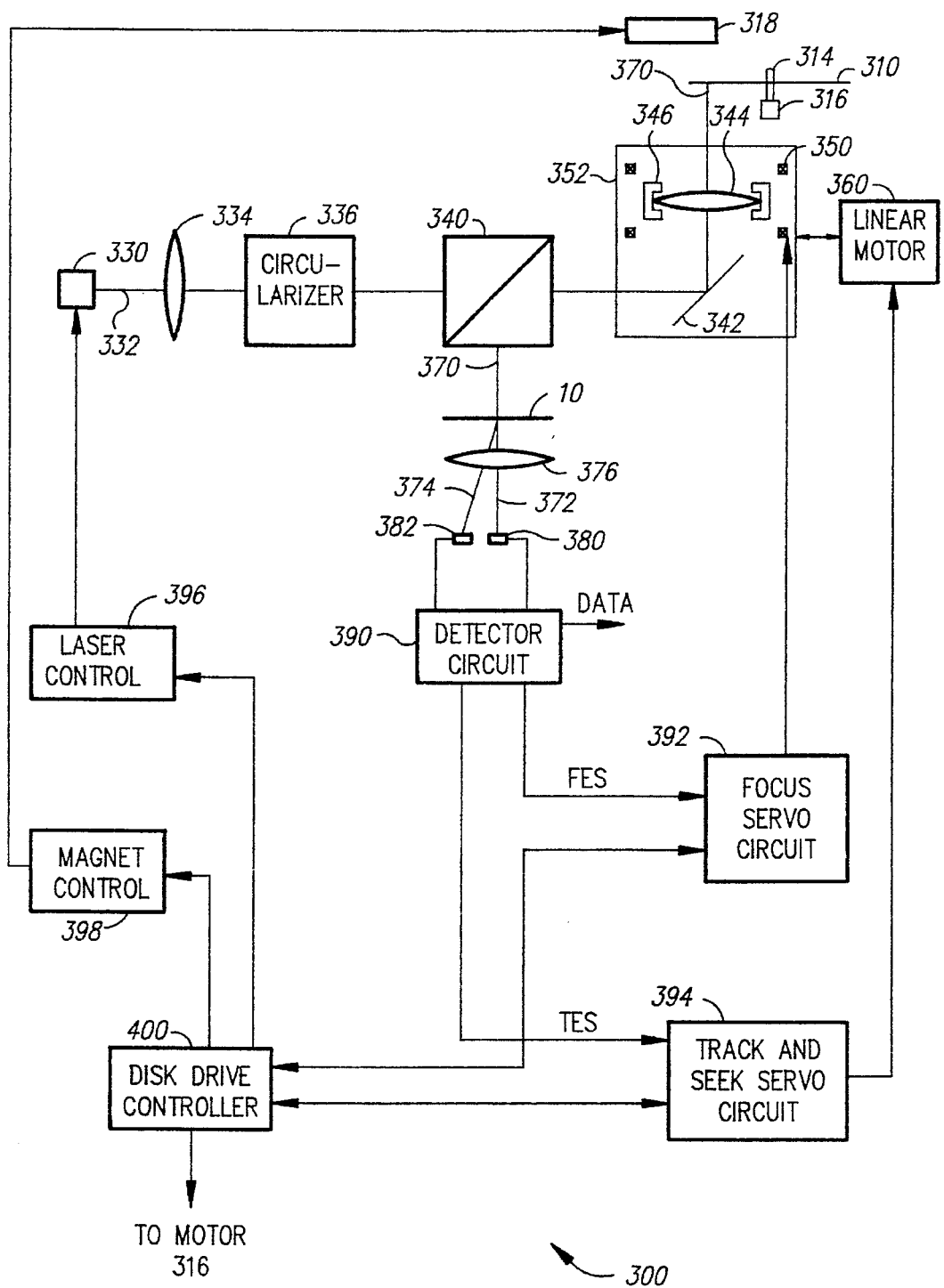
FIG. 8 is a schematic diagram of an optical data storage system of the present invention.

The present invention may be used in optical data storage systems. FIG. 8 shows a schematic diagram of an optical data storage system of the present invention and is designated by the general reference number 300. System 300 includes an optical data storage medium 310 which is preferably disk-shaped. Medium 310 is preferably a magneto-optic medium. Medium 310 is removably mounted to a clamping spindle 314 as is known in the art. Spindle 314 is attached to a spindle motor 316. Motor 316 rotates spindle 314 and medium 310. A bias electro-magnet 318 is located above medium 310.

A laser 330 generates a light beam 332. Laser 330 may be a gallium-aluminum-arsenide diode laser which produces light at approximately 780 nm in wavelength. Beam 332 is collimated by a lens 334 and is circularized by a circularizer 336. Circularizer 336 may be a circularizing prism. Beam 332 passes through a beamsplitter 340. Beam 332 is then reflected by a mirror 342 to a lens 344. Lens 344 focuses beam 332 to medium 310. Lens 344 is mounted to a lens holder 346. Holder 346 may be moved up or down relative to medium 310 by a focus actuator motor 350 which may be a voice coil motor.

Mirror 342, lens 344, holder 346 and motor 350 comprise an optical head 352. Head 352 may be moved in a radial direction relative to medium 310 by a linear motor 360.

A portion of beam 332 is reflected by medium 310 as a beam 370. Beam 370 passes through lens 344 and is reflected by mirror 342 to beamsplitter 340. At beamsplitter 340, beam 370 is reflected to hologram assembly 10. At assembly 10, beam 370 is divided into a beam 372 and a beam 374 which correspond to beams 36 and 34, respectively, as shown in FIG. 1.

Beams 372 and 374 are focussed by a lens 376 to a segmented optical detector 380 and a single optical detector 382, respectively. Detectors 380 and 382 are connected to a detector circuit 390. Detector circuit 390 generates a data signal, a focus error signal (FES) and a tracking error signal (TES). A focus servo 392 is connected to circuit 390 and to motor 350. A track and seek servo 394 is connected to detector circuit 390 and to linear motor 360. A laser control 396 is connected to and provides power to laser 330. A magnet control 398 is connected to and provides power to magnet 318. A disk drive controller 400 is connected to and controls motor 316, servos 392 and 394, laser control 396 and magnet control 398. Servos 392 and 394, laser control 396, magnet control 398 and controller 400 are all known in the art.

Figure 9:
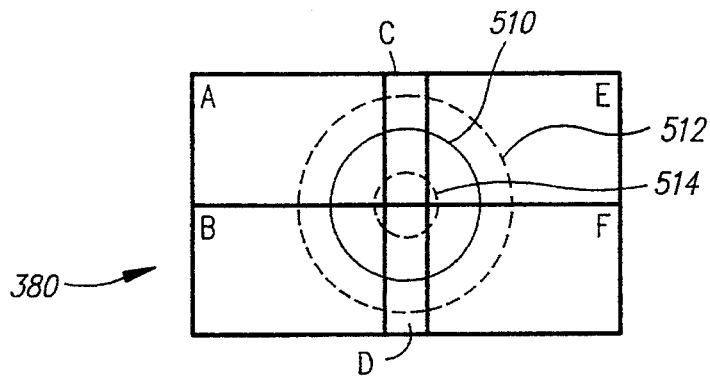
FIG. 9 is a schematic diagram of a portion of the system of FIG. 8.

FIG. 9 shows a top view of detector 380. The detector 380 is divided into six sections 380A, B, C D, E and F.

Figure 10:
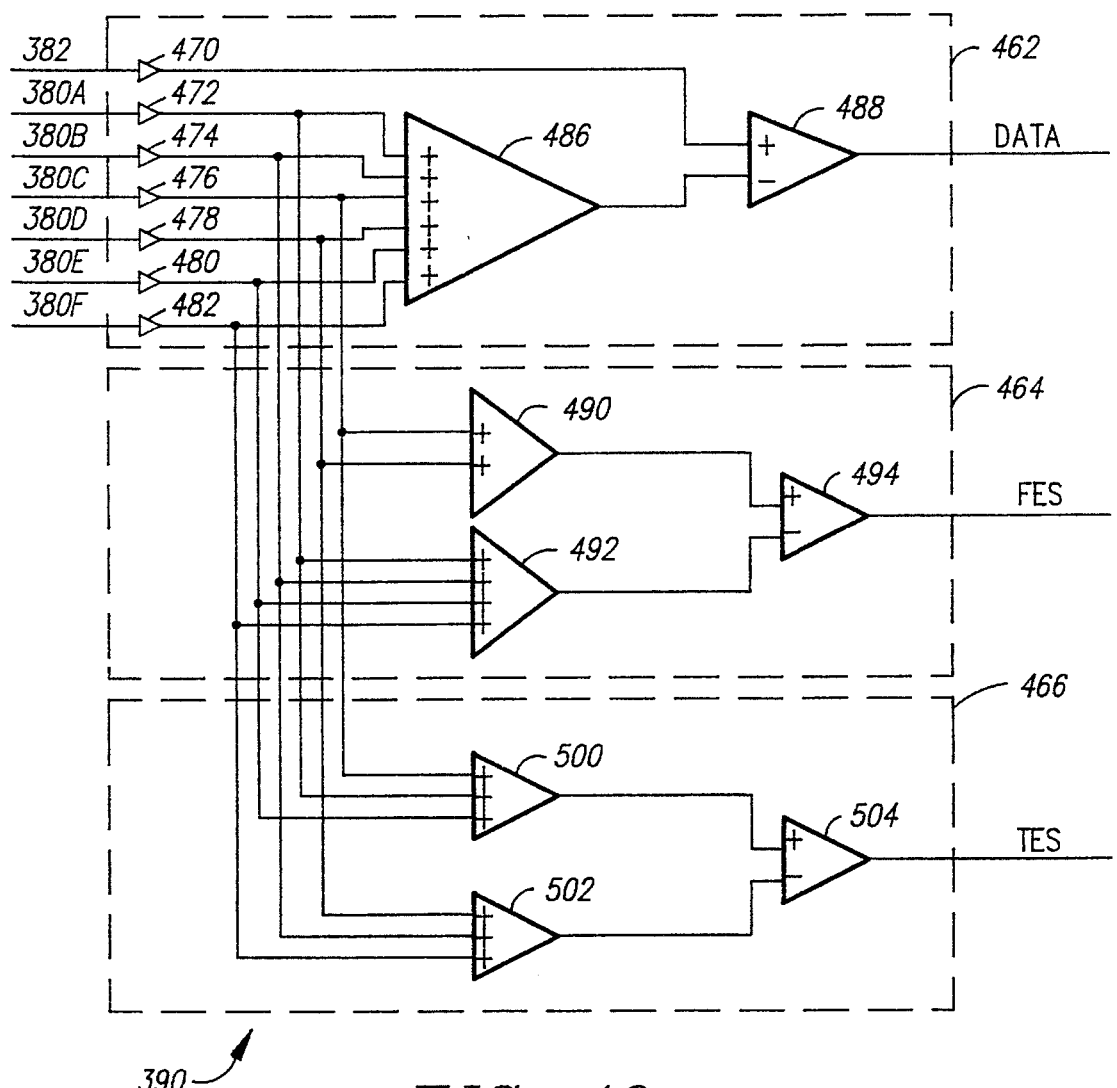
FIG. 10 is a circuit diagram of a portion of the system of FIG. 8.

FIG. 10 shows a circuit diagram of a detector circuit 390. Circuit 390 comprises a data circuit 462, a focus error circuit 464, and a tracking error circuit 466. Data circuit 462 has an amplifier 470 connected to detector 382 and a plurality of amplifiers 472, 474, 476, 478, 480 and 482 connected to optical detector segments 380A, B, C, D, E and F, respectively. Amplifiers 472–482 are connected to a summing amplifier 486. Amplifier 470 and amplifier 486 are connected to a differential amplifier 488. The output of amplifier 488 is the data signal.

The focus error circuit 464 comprises a pair of summing amplifiers 490 and 492, and a differential amplifier 494. Amplifier 490 is connected to amplifiers 476 and 478. Amplifier 492 is connected to amplifiers 472, 474, 480 and 482. Amplifiers 490 and 492 are connected to differential amplifier 494 and the output of amplifier 494 is the focus error signal (FES).

Tracking error circuit 466 comprises a pair of summing amplifiers 500 and 502, and a differential amplifier 504. Amplifier 500 is connected to amplifiers 472, 476 and 480. Amplifier 502 is connected to amplifiers 474, 478 and 482. Amplifier 504 is connected to amplifiers 500 and 502 and generates a tracking error signal (TES).

The operation of system 300 may now be understood. When it is desired to write data onto medium 310, magnet 318 and laser 330 are turned on. Laser 330 produces a write beam 332 which is of sufficient intensity to heat spots on medium 310 to a temperature above its Curie temperature. At this temperature, the spots will align with the magnetic field produced by magnet 318. Laser 330 is controlled to provide a pulsed beam 332 representative of the data to be recorded. The data is thus recorded as spots on medium 310 which have an up or down magnetic orientation.

During the write operation, reflected beam 370 returns to hologram element 10. The beam 370 is divided into a P polarization component beam 374 and an S polarization component beam 372. See FIG. 8. When beam 332 is exactly focussed on medium 310, beam 372 will have a circular cross-section 510 on detector 380. See FIG. 9. The amount of light hitting areas C and D will be approximately equal to the amount of light hitting areas A, B, E and F, and will cause circuit 464 to generate a zero focus error signal. If beam 332 is slightly out of focus one way or the other, beam 372 will fall as a circular cross-section 512 or 514 on detector 380. This will cause circuit 464 to generate a positive or negative focus error signal. The focus error signal is used to control motor 350 to move lens 344 until the focus is again achieved.

If beam 332 is focussed exactly on a track of medium 310, then beam 372 will fall as a circular cross-section 510 equally between the sections A, C and E, and the sections B, D and F. If beam 332 is off track it will fall more on sections A, C and E, and less on sections B, D and F, or vice versa. This will result in a positive or negative tracking error signal being produced by circuit 466. This tracking error signal is then used to control motor 360 to move head 352 until the beam is once again on track.

When it is desired to read data recorded on the disk, laser 330 is energized to produce a read beam 332. Read beam 332 is of low enough intensity such that medium 310 is not heated above its Curie temperature. The beam 332 is focussed by a lens 344 onto medium 310. The data has already been recorded on the medium as up or down oriented magnetic domains. Light reflected from the medium has its plane of polarization rotated one way or the other depending on the orientation of the magnetic domains. The reflected beam 370 returns and is divided into beams 372 and 374 at hologram element 10. The P polarization component beam 374 is detected by a detector 382 and the S polarization component beam 372 is detected by detector 380. Circuit 462 compares the intensity of the two beams and generates a data signal which is representative of the data recorded on medium 310.

While the invention has been particularly shown and described with reference to the preferred embodiments thereof, it will be understood by those skilled in the art that various other changes in form and detail may be made without departing from the spirit and scope of the invention.

What is claimed is:

1. A hologram system comprising:
   a first volume hologram having a plurality of Bragg planes, each Bragg plane set at an angle $\Phi_2$ relative to an exterior planar surface of the first volume hologram, and each Bragg plane spaced a distance $L_1$ apart;
   a second volume hologram having a plurality of Bragg planes, each Bragg plane set at an angle $\Phi_2$ relative to an exterior planar surface of the second volume hologram, and each Bragg plane spaced a distance $L_2$ apart, $\Phi_2$ being equal to $\Phi_1$ and $L_2$ being equal to $L_1$, the second volume hologram oriented with its exterior planar surface substantially parallel to the exterior planar surface of the first volume hologram and with its Bragg planes offset at a rotational angle relative to the Bragg planes of the first volume hologram, the rotational angle being about an axis substantially perpendicular to the exterior planar surfaces of the first and second volume holograms, the Bragg planes of the second hologram being nonparallel to the Bragg planes of the first hologram; and
   a coupling device for maintaining the first and second volume holograms in an optically coupled relationship.

2. The system of claim 1, wherein the thickness of each of the first and second volume holograms is 5 microns.

3. The system of claim 1, further including a first substrate and a second substrate in supporting relationship to the first and second volume holograms, respectively.

4. The system of claim 1, wherein the coupling device is a radiation cured cement.

5. The system of claim 1, wherein the coupling device is time cured cement.

6. The system of claim 1, wherein the first and second volume holograms are made from separate pieces of a single volume hologram.

7. The system of claim 1, wherein the Bragg planes of the first and second volume holograms are both substantially perpendicular to their respective exterior planar surfaces.

8. The system of claim 1, wherein the first volume hologram receives a radiation beam and diffracts a first polarization component of the radiation beam and transmits a second polarization component of the radiation beam, and the second volume hologram transmits the second polarization component and diffracts the first polarization component, the first and second polarization components exiting the second hologram at a non-zero degree separation angle relative to one another.

9. The system of claim 8, wherein the separation angle is in the range of 1°–10°.

10. The system of claim 8, wherein the first and second polarization components are of orthogonal polarization.

11. A method for making a hologram system comprising the system comprising the steps of:
    positioning a first volume hologram and a second volume hologram in optical communication with one another, the first volume hologram having a plurality of Bragg planes, each Bragg plane set at an angle $\Phi_1$ relative to an exterior planar surface of the first volume hologram, and each Bragg plane spaced a distance $L_1$ apart, the second volume hologram having a plurality of Bragg planes, each Bragg plane set at an angle $\Phi_2$ relative to an exterior surface of the second volume hologram, and each Bragg plane spaced a distance $L_2$ apart, $\Phi_2$ being equal to $\Phi_1$ and $L_2$ being equal to $L_1$, the first and second volume holograms positioned such that their exterior planar surfaces are substantially parallel; and
    rotationally moving the first and second volume holograms relative to one another about an axis substantially perpendicular to the exterior planar surfaces of the holograms until their respective Bragg planes are oriented at a non-zero degree rotation angle with respect to one another and their respective Bragg planes being nonparallel with respect to one another.

12. The method of claim 11, further including the steps of:
    passing a laser beam through the first and second volume holograms to produce a diffracted beam and an undiffracted beam; and
    securing the relative positions of the first and second volumes holograms.

13. The method of claim 11, further comprising the step of placing a cement between the first volume hologram and the second volume hologram and curing the cement to bond the first and second volume holograms together.

14. A hologram system made using the method of claim 11.

15. A hologram system comprising:
    an optical data storage medium;
    a radiation source for generating a radiation beam;
    a transmission device for transmitting the radiation beam to the medium; and
    a reception device for receiving a return radiation beam from the medium, the reception device including a hologram assembly for receiving and separating the return radiation beam into two component beams at a desired separation angle, the hologram assembly comprising a first volume hologram and a second volume hologram, the first volume hologram having a plurality of Bragg planes, each Bragg plane set at an angle $\Phi_1$ relative to an exterior planar surface of the first volume hologram, and each Bragg plane spaced a distance $L_1$ apart, the second volume hologram having a plurality of Bragg planes, each Bragg plane set at an angle $\Phi_2$ relative to an exterior planar surface of the second volume hologram, and each Bragg plane spaced a distance $L_2$ apart, $\Phi_2$ being equal to $\Phi_1$ and $L_2$ being equal to $L_1$, the second volume hologram oriented with its exterior planar surface substantially parallel to the exterior planar surface of the first volume hologram and with its Bragg planes offset at a rotational angle relative to the Bragg planes of the first volume hologram, the rotational angle being about an axis substantially perpendicular to the exterior planar surfaces of the first and second volume holograms, the Bragg planes of the second hologram being nonparallel to the Bragg planes of the first hologram, and a coupling device for maintaining the first and second volume holograms in an optically coupled relationship.

16. The system of claim 15, wherein the thickness of each of the first and second volume holograms is 5 microns.

17. The system of claim 15, further including a first substrate and a second substrate in supporting relationship to the first and second volume holograms, respectively.

18. The system of claim 15, wherein the coupling device is a radiation cured dement.

19. The system of claim 15, wherein the coupling device is a time cured cement.

20. The system of claim 15, wherein the first and second volume holograms are made from separate pieces of a single volume hologram.

21. The system of claim 15, wherein the Bragg planes of the first and second volume holograms are both substantially perpendicular to their respective exterior planar surfaces.

22. The system of claim 15, wherein the first volume hologram receives a radiation beam and diffracts a first polarization component of the radiation beam and transmits a second polarization component of the radiation beam, and the second volume hologram transmits the second polarization component and diffracts the first polarization component, the first and second polarization components exiting the second hologram at a non-zero degree separation angle relative to one another.

23. The system of claim 22, wherein the separation angle is in the range of 1°–10°.

24. The system of claim 22, wherein the first and second polarization components are of orthogonal polarization.

25. A hologram system comprising:

a first substrate;

a first volume hologram overlying the first substrate, the first volume hologram having a plurality of Bragg planes, each Bragg plane set at an angle $\Phi_1$ relative to an exterior planar surface of the first volume hologram, and each Bragg plane spaced a distance $L_1$ apart;

a second substrate;

a second volume hologram overlying the second substrate, the second volume hologram having a plurality of Bragg planes, each Bragg plane set at an angle $\Phi_2$ relative to an exterior planar surface of the second volume hologram, and each Bragg plane spaced a distance $L_2$ apart, $\Phi_2$ being equal to $\Phi_1$ and $L_2$ being equal to $L_1$, the second volume hologram oriented with its exterior planar surface substantially parallel to the exterior planar surface of the first volume hologram and with its Bragg planes offset at a rotational angle relative to the Bragg planes of the first volume hologram, the rotational angle being about an axis substantially perpendicular to the exterior planar surfaces of the first and second volume holograms, the Bragg planes of the second hologram being nonparallel to the Bragg planes of the first hologram; and an optical cement located between the first and second volume holograms for holding the first and second volume holograms together.

26. The system of claim 25, wherein the optical cement is a radiation cured cement.

27. The system of claim 25, wherein the optical cement is a time cured cement.

28. The system of claim 25, wherein $\Phi_1$ and $\Phi_2$ are both substantially equal to 90°.

29. The system of claim 25, wherein the thickness of each of the first and second volume holograms is 5 microns.

30. The system of claim 25, wherein the first volume hologram receives a radiation beam and diffracts a first polarization component of the radiation beam and transmits a second polarization component of the radiation beam, and the second volume hologram transmits the second polarization component and diffracts the first polarization component, the first and second polarization components exiting the second hologram at a non-zero degree separation angle relative to one another.

31. The system of claim 30, wherein the separation angle is in the range of 1°–10°.

32. The system of claim 30, wherein the first and second polarization components are of orthogonal polarization.

* * * * *

UNITED STATES PATENT AND TRADEMARK OFFICE
CERTIFICATE OF CORRECTION

PATENT NO. : 5,602,657
DATED : February 11, 1997
INVENTOR(S) : Dickson, et al.

It is certified that error appears in the above-indentified patent and that said Letters Patent is hereby corrected as shown below:

Column 6, Line 23, "angle $O_t$" should be --angle $\theta_r$--.
Column 6, Line 23, "refract" should be --refraction at the surfaces of--.

IN THE CLAIMS:

Column 9, Line 9, "$\phi_2$" should be --$\phi_1$--.

Signed and Sealed this

Second Day of December, 1997

Attest:

BRUCE LEHMAN

*Attesting Officer*     *Commissioner of Patents and Trademarks*